United States Patent
Kasahara

(10) Patent No.: US 10,926,367 B2
(45) Date of Patent: Feb. 23, 2021

(54) MACHINE TOOL

(71) Applicant: MAKINO MILLING MACHINE CO., LTD., Tokyo (JP)

(72) Inventor: Tadashi Kasahara, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 51 days.

(21) Appl. No.: 15/758,490

(22) PCT Filed: Sep. 30, 2015

(86) PCT No.: PCT/JP2015/077836
§ 371 (c)(1),
(2) Date: Mar. 8, 2018

(87) PCT Pub. No.: WO2017/056264
PCT Pub. Date: Apr. 6, 2017

(65) Prior Publication Data
US 2018/0250784 A1    Sep. 6, 2018

(51) Int. Cl.
*B23Q 17/00* (2006.01)
*B23Q 17/09* (2006.01)
(Continued)

(52) U.S. Cl.
CPC ..... *B23Q 17/0909* (2013.01); *B23Q 3/15546* (2013.01); *B23Q 3/15513* (2013.01);
(Continued)

(58) Field of Classification Search
None
See application file for complete search history.

(56) References Cited

U.S. PATENT DOCUMENTS 4,185,376 A * 1/1980 Johnstone ............. B23B 49/001
                                              408/56
2005/0222705 A1* 10/2005 Budd ................. B23Q 17/0909
                                              700/175
(Continued)

FOREIGN PATENT DOCUMENTS

JP       63-197041       12/1988
JP       1-240251        9/1989
(Continued)

OTHER PUBLICATIONS

International Search Report dated Nov. 10, 2015, directed to PCT Application No. PCT/JP2015/077836; 2 pages.

*Primary Examiner* — Paul B Yanchus, III
(74) *Attorney, Agent, or Firm* — Morrison & Foerster LLP

(57) ABSTRACT

This machine tool has a tool changing device, and sequentially changes tools to machine a workpiece. The machine tool comprises: an input unit which receives a machining program output from a CAM system and tool basic data; a storage unit which stores the tool basic data received from the input unit for each tool number; a tool measuring device which measures the size of a tool loaded into a tool magazine of the tool changing device; and a determination unit which compares the tool basic data stored in the storage unit and the actual data measured by the measuring device, and determines that the measured tool is different from a desired tool if the difference between the two tool sizes is beyond a preset allowable range.

5 Claims, 3 Drawing Sheets

(51) Int. Cl.
*B23Q 3/155* (2006.01)
*B23Q 17/24* (2006.01)

(52) U.S. Cl.
CPC ...... *B23Q 3/15526* (2013.01); *B23Q 17/2461* (2013.01); *B23Q 2003/1553* (2016.11); *Y10T 483/115* (2015.01)

(56) References Cited

U.S. PATENT DOCUMENTS

| | | | |
|---|---|---|---|
| 2009/0129882 A1* | 5/2009 | Tchouprakov | A61C 13/0009 409/131 |
| 2012/0116570 A1 | 5/2012 | Nishioka et al. | |
| 2013/0103182 A1* | 4/2013 | Patry | G05B 19/406 700/177 |
| 2015/0266153 A1 | 9/2015 | Kanehira et al. | |

FOREIGN PATENT DOCUMENTS

| | | |
|---|---|---|
| JP | 5-84631 | 4/1993 |
| JP | 10-113836 | 5/1998 |
| JP | 10-138094 | 5/1998 |
| JP | 2008-246602 | 10/2008 |
| JP | 2015-131357 | 7/2015 |
| WO | 2008/136556 | 11/2008 |

* cited by examiner

| POT # | | TOOL # | TOOL TYPE | REF LENGTH [mm] | TOLERANCE | REF DIAMETER [mm] | TOLERANCE | BATCH MEASUREMENT | BATCH MEASUREMENT | STATUS |
|---|---|---|---|---|---|---|---|---|---|---|
| SPINDLE TOOL (2) | △ | 2 | FLAT END MILL | 100.0000 | 1.0000 | | | ☒ | ☐ | NORMAL |
| NEXT TOOL (11) | △ | 11 | DRILL | 60.0000 | 1.0000 | | | ☒ | ☐ | NORMAL |
| 1 | △ | 1 | BALL END MILL | 80.0000 | 1.0000 | 10.0000 | 1.0000 | ☒ | ☒ | NORMAL |
| 2 | △ | 2 | FLAT END MILL | 65.0000 | 1.0000 | 6.0000 | 1.0000 | ☒ | ☒ | IMPROPER |
| 3 | △ | 3 | BALL END MILL | 120.0000 | 1.0000 | | | ☐ | ☐ | NORMAL |
| 4 | △ | 4 | BALL END MILL | 100.0000 | 1.0000 | | | ☐ | ☐ | NORMAL |
| 5 | △ | 5 | BALL END MILL | 90.0000 | 1.0000 | | | ☒ | ☐ | NORMAL |
| 6 | △ | 6 | FACE MILL | 150.0000 | 1.0000 | | | ☒ | ☐ | NORMAL |
| 7 | △ | 7 | FACE MILL | 155.0000 | 1.0000 | | | ☐ | ☐ | NORMAL |
| 8 | △ | 8 | DRILL | 90.0000 | 1.0000 | | | ☐ | ☐ | NORMAL |
| 9 | △ | 9 | DRILL | 88.0000 | 1.0000 | | | ☒ | ☒ | NORMAL |
| 10 | △ | 10 | RADIUS END MILL | 120.0000 | 1.0000 | 20.0000 | 1.000 | ☒ | ☒ | NORMAL |

DISPLAY RANGE: TOOL INFO: TOOL DATA  
INSIDE MAGAZINE DETAILS  
TOOL USED  
TOOL DATA  
REF DIMENSION  
TOLERANCE (+)  
TOLERANCE (−)  
REF DIMENSION  
TOLERANCE (+)  
TOLERANCE (−)  
TOOL LENGTH  
TOOL DIAMETER  
35  
35a 35b  
35c  
BATCH MEASUREMENT  
REF DATA  
INPUT MODE

EDIT PROGRAM  
TOOL INFO  
COORDINATE INFO  
PROGRAM EXEC INFO  
MACHINING RESULT

MACHINE TOOL

CROSS-REFERENCE TO RELATED APPLICATION

This application is a U.S. national phase patent application of International Patent Application No. PCT/JP2015/077836, filed Sep. 30, 2015, the contents of which is hereby incorporated by reference in the present disclosure in its entirety.

FIELD OF THE INVENTION

The present invention relates to a machine tool having a tool changer.

BACKGROUND OF THE INVENTION

In a machining center or other machine tool which moves a tool and workpiece relative to each other to machine the workpiece, a plurality of types of tools are used in machining a single workpiece. When using a plurality of types of tools for machining, a machine tool provided with a tool changer for changing the tools is used. A tool changer can automatically change tools in accordance with a machining program.

To perform the machining designated by the machining program, the shape of a tool envisioned when preparing the machining program and the shape of the tool which is selected from the tool magazine of the tool changer and is actually used for machining must match. However, due to human error, sometimes a tool of a shape different from the tool envisioned when preparing the machining program is loaded in the tool magazine. If proceeding with machining without being able to detect that the shapes of the tools do not match, defective products will be produced and damage may even be inflicted on the machine tool side.

PLT 1 describes detecting the above-mentioned such mismatch of tools by a method of checking a tool used comprising comparing a program tool information table comprised of tool nos. in a machining program and tool attribute information and a magazine tool information table comprised of tool nos. of tools stored in a tool magazine and tool attribute information so as to detect machining tools of tool nos. with a mismatch of tool attribute information.

PATENT LITERATURE

PLT 1: Japanese Unexamined Patent Publication No. 10-113836A

BRIEF SUMMARY OF INVENTION

According to the method shown in PLT 1, it is possible to detect a mismatch of tools in data of a program tool information table and magazine tool information table. However, according to the method of PLT 1, it is not possible to detect when a nondesignated tool is mistakenly loaded in the tool magazine. Further, if the cutting edge of a tool becomes damaged, that abnormality cannot be detected before machining.

If machining a workpiece in a state of mismatch between the machining program and tool data and the actual tool loaded in the tool magazine before machining, the machine tool is liable to be severely damaged, a defective workpiece is liable to be formed, and the machining time until an improper tool is called up by the machining program and the machine tool abnormally stops is liable to be wasted. Further, if the machine tool abnormally stops during automatic operation, the machine tool will remain stopped until the operator next visits the vicinity of the machine tool and therefore the operating rate of the machine tool will fall.

The present invention is made in consideration of the above situation and has as its object the provision of a machine tool able to judge if a tool actually being used for machining is a suitable one.

To achieve the above-mentioned object, according to the present invention, there is provided a machine tool having a tool changer and sequentially changing tools to machine a workpiece, the machine tool comprising an input unit for inputting a machining program output from a CAM system and basic data of the tools, a storage unit storing the basic data of the tools input from the input unit for each tool no., a tool measuring device measuring dimensions of the tools loaded in a tool magazine of a tool changer, and a judging unit comparing the basic data of the tools stored in the storage unit with actual measurement data measured by the measuring device and judging that a measured tool differs from a desired tool if a difference in dimensions between the measured and desired tools exceeds a predetermined allowable range.

Due to this, before ending up machining using a tool different in shape from a tool which had been envisioned in the machining program, it is possible to detect a mismatch between a machining program and tool data and an actual tool loaded in the tool magazine.

In the present invention, the tool measuring device can measure the tools after being loaded in the tool magazine and before being used for machining and the judging unit can judge that the measured tool is an improper tool mistakenly loaded and send a first warning signal to a display unit of the machine tool if the difference in dimensions exceeds the allowable range.

Due to this, it is possible to discriminate a state where the combination of tools is improper in various tool abnormalities.

In the present invention, when the machining program is executed regardless of the issuance of the first warning signal, it is possible to suspend the machining right before the improper tool is used for machining.

In the present invention, the tool measuring device measures the tools used for machining when returned to the tool magazine. The judging unit can judge that the measured tool is a damaged tool and send a second warning signal to the display unit if the difference in dimensions exceeds an allowable range.

Due to this, even among tool abnormalities, it is possible to discriminate between whether it is improper or if the tool is damaged.

In the present invention, when the second warning signal is issued, it is possible to automatically change the tool judged as a damaged tool to a spare tool loaded in advance in the tool magazine and execute the machining program.

In the present invention, the machining time or distance of movement for each of the tools when the tool is used for machining can be cumulatively added and stored and a third warning signal indicating that the tool has reached the end of its service life can be issued when that machining time or distance of movement exceeds a predetermined value.

In the present invention, the tool measuring device may be a tool measuring device of an image-capturing type provided with an image-capturing device and the image-capturing device may be arranged inside the tool storage chamber of the machine tool together with the tool changer and capture an image of the workpiece.

According to the present invention, the dimensions of the tools loaded in the tool magazine and used for actual machining are measured by the machine tool and judged for suitability, so, for example, it becomes possible to easily detect a mistakenly loaded tool in the tool magazine or occurrence of damage to a tool. Due to this, the problems of damage to the machine tool and poor machining of a workpiece due to machining by the wrong tool can be prevented.

Further, an operator can recognize an abnormality in a tool before the machining program is used to automatically operate the machine tool, so can immediately correct a mistake and prevent wasted machining time or machine shutdown time. Furthermore, even among tool abnormalities, by discriminating whether the tool is improper or the tool is damaged, it is possible to determine if there is an error in the machining program or basic data of the tools and therefore the operator can determine the cause of the error in the tool in a short time.

BRIEF DESCRIPTION OF DRAWINGS

FIG. 1 is a schematic lateral cross-sectional view of a machine tool in an embodiment of the present invention.

FIG. 3 is a tool information screen shown on a display unit of the machine tool.

DETAILED DESCRIPTION OF THE INVENTION

Figure 1:
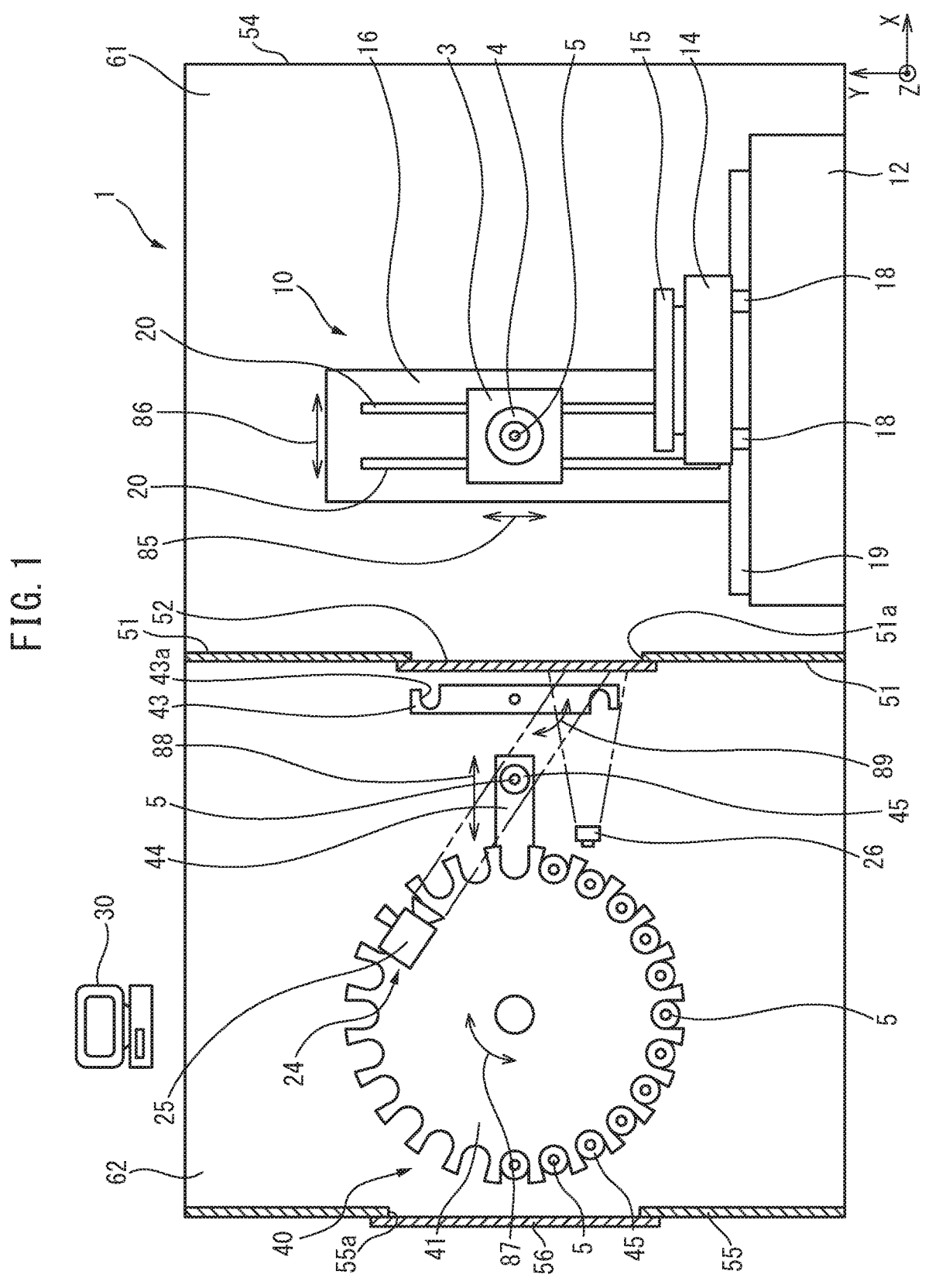
Figure 2:
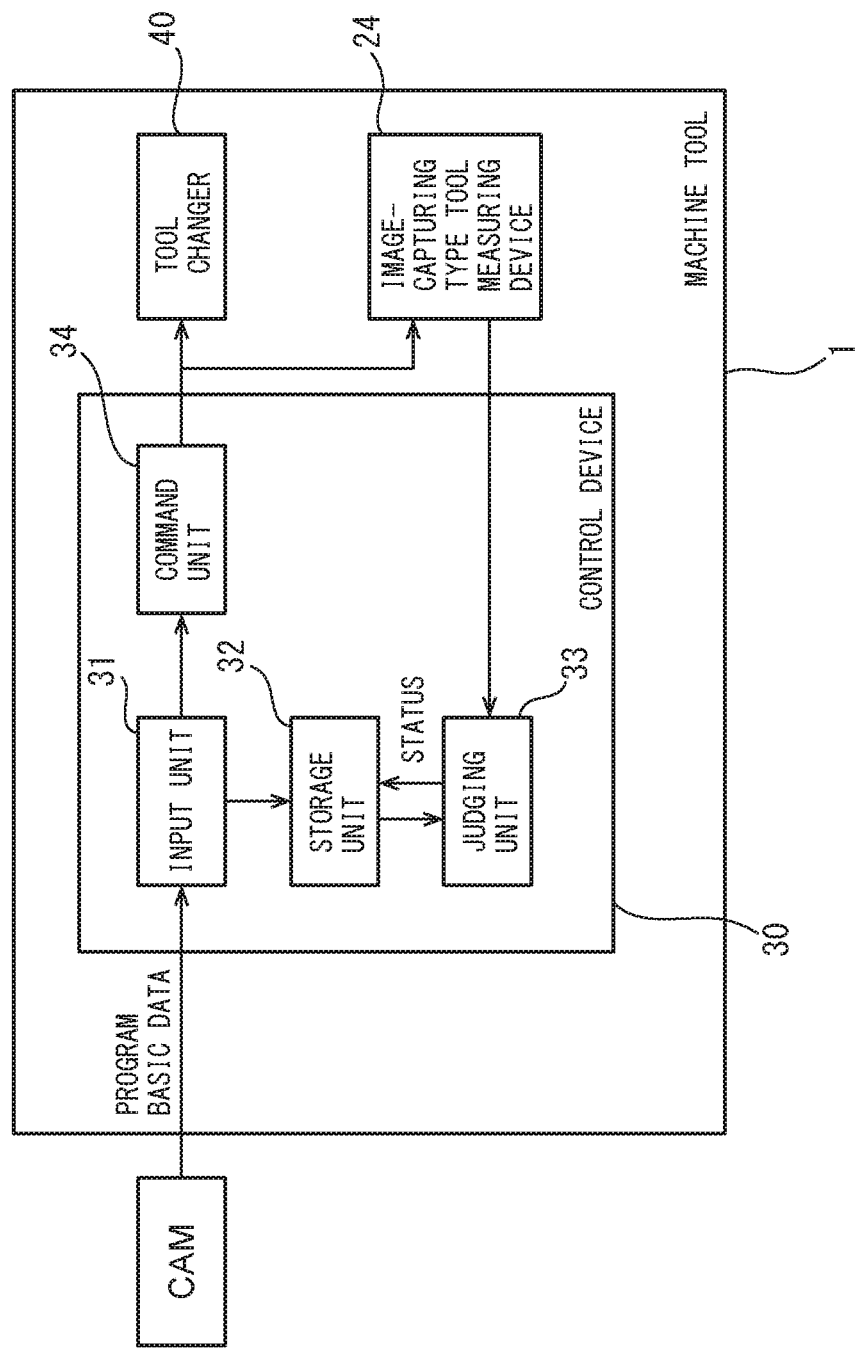
FIG. 2 is a block diagram showing the configuration of the machine tool.

Referring to FIG. 1 to FIG. 3, a machine tool 1 according to an embodiment of the present invention will be explained. The machine tool 1 according to the present embodiment is a numerical control type which moves the tool 5 and workpiece relative to each other automatically based on a machining program.

FIG. 1 is a schematic lateral cross-sectional view of a machine tool 1 according to an embodiment of the present invention. The machine tool 1 is a horizontal machining center comprising a machine tool body 10, tool changer 40, control device 30, tool measuring device 24, machining chamber 61, and tool storage chamber 62. The machining chamber 61 and tool storage chamber 62 are surrounded by a splash guard 54. The machine tool body 10 is arranged inside the machining chamber 61, while the tool changer 40 and a camera 25 and lighting device 26 of the tool measuring device 24 are arranged inside the tool storage chamber 62.

The machining chamber 61 and tool storage chamber 62 are separated by a partition wall 51. The partition wall 51 is formed with an open part 51a for movement of tools between the machining chamber 61 and the tool storage chamber 62. At the partition wall 51, a shutter 52 is arranged for opening and closing the open part 51a. Further, a side wall 55 of the tool storage chamber 62 facing the partition wall 51 is provided with a tool conveyance opening 55a and a door 56 for closing the same.

The machine tool body 10 is provided with bed 12 serving as a base, an X-axis guide rail 19 and Z-axis guide rail 18 fixed on the top surface of the bed 12, a table 14 arranged on the top surface of the Z-axis guide rail, a column 16 arranged on the top surface of the X-axis guide rail 19, a Y-axis guide rail 20 fixed on the front surface of the column 16, and a spindle head 3 supported on the Y-axis guide rail 20. A spindle 4 of the spindle head 3 holds a tool 5 for machining a workpiece (not shown) to be able to be changed. A workpiece is fixed on the table 14 through a pallet 15. The column 16, as shown by the arrow mark 86, moves in the X-axial direction, the spindle head 3, as shown by the arrow mark 85, moves in the Y-axial direction, and the table 14 moves in the Z-axial direction.

The tool changer 40 includes a tool magazine 41 storing a plurality of tools 5 and a conveyor conveying the tools between the tool magazine 41 and the spindle 4. The tool magazine 41 of the present embodiment is formed as a base member formed into a disk shape around which tools 5 are held through tool holders 45. The tool changer 40 includes a motor for turning the tool magazine 41. The tool magazine 41 turns as shown by the arrow mark 87.

The conveyor includes a tool shifter 44 and tool changing arm 43. The tool shifter 44 moves a tool between the tool magazine 41 and a tool standby position. The tool standby position is a position where the tool changing arm 43 can hold a tool. The tool shifter 44 moves in the direction shown by the arrow mark 88 so as to detach a tool 5 from the tool magazine 41 or attach a tool 5 to the tool magazine 41.

The tool changing arm 43 has holding parts 43a holding tools 5 at its two end parts. The tool changer 40 includes a motor for turning the tool changing arm 43 and can make the tool changing arm 43 turn as shown by the arrow mark 89.

If changing a tool 5, in the machining chamber 61, the spindle head 3 moves to a predetermined position for changing the tool 5. In the tool storage chamber 62, the tool magazine 41 turns to a position at which the tool 5 to be used next is held at the tool shifter 44. The tool shifter 44 moves the tool 5 to be used next in the X-direction from the tool magazine 41 to the tool standby position.

Next, the shutter 52 opens and the tool changing arm 43 turns. The tool changing arm 43 holds a tool 5 which had been held at the tool shifter 44 and a tool 5 which had been attached to the spindle 4. Furthermore, by the tool changing arm 43 turning, the tool 5 to be used next is attached to the spindle 4 and the tool 5 finishing machining is attached to the tool shifter 44. The tool shifter 44 returns the tool 5 finishing machining to the tool magazine 41.

In this way, the tool changer 40 can move a tool 5 attached to the spindle 4 to the tool magazine 41. Further, the tool changer 40 can move a tool 5 stored in the tool magazine 41 to the spindle 4. After tools 5 finish being changed, the tool changing arm 43 rotates to its initial state. The shutter 52 closes, then the next machining is started in the machining chamber 61.

FIG. 1 shows the state where a tool 5 inside the tool holder 45 held at the front end part of the tool shifter 44 is placed at the tool standby position. The tool measuring device 24 in the present embodiment includes an image-capturing device comprised of a camera 25, a lighting device 26, and an image processing part (not shown) and is an image-capturing system capturing an image of a tool 5 to measure the dimensions of the tool. As the camera 25, it is possible to employ a CCD camera or any other camera able to process a captured image. Further, the tool measuring device 24 is a backlight type where in the captured image of the tool 5, the background of the tool 5 becomes bright while the tool 5 becomes dark.

The image processing part (not shown) of the tool measuring device 24, in the present embodiment, is arranged inside the housing of the control device 30. The image captured by the camera 25 is input to the image processing part, while the image processing part calculates the dimensions of the tool from the image. The image processing part measures the numbers of pixels of the part corresponding to the tool 5 and the part corresponding to other than the tool and calculates the dimensions of the tool 5 based on the number of pixels of the part corresponding to the tool 5. The dimensions of the tool 5 include the tool length and the tool diameter. The calculated dimensions of the tool 5 are sent to the control device 30 where it is judged if the tool 5 is a proper one. Further, it is judged if the tool 5 is damaged.

In the present embodiment, the camera 25 is arranged so as to capture an image of a tool 5 when the tool 5 is arranged at the tool standby position inside the tool storage chamber 62. The image is captured, in the present embodiment, sequentially for a plurality of selected tools 5 after the operator loads the tools 5 inside the tool magazine 41 and before starting machining.

The lighting device 26 operates as a light source emitting light toward the shutter 52. The light shining on the shutter 52 is reflected, so part of the light emitted by the lighting device 26 heads toward the camera 25. In this way, the tool measuring device 24 employs not a direct lighting system shining light directly on a tool 5, but an indirect lighting system of shining light on a tool 5 by reflected dispersed reflected light.

The lighting device 26 is a bright light source which generates a luminance whereby the tool as a whole becomes darker so that the shape of the tool in the captured image becomes clearer and the dimensions of the tool can be measured more precisely.

FIG. 2 is a block diagram showing the configuration of the machine tool 1 of the present embodiment. This block diagram shows the components of the machine tool 1 necessary for judging the suitability of the tools, but components for controlling the machine tool body 10 are sufficiently known, so are not shown. The control device 30 is, for example, provided with a CPU, RAM, ROM, etc. connected with each other through a bus and is configured so as to control the machine tool body 10, tool changer 40, and tool measuring device 24. However, as explained above, FIG. 2 shows the components of the control device 30 required for judging suitability of the tools.

The control device 30 is provided with an input unit 31, storage unit 32, judging unit 33, command unit 34, and control panel (not shown). The input unit 31 receives as input the machining program output from a CAM system and basic data of the tools used for machining.

The storage unit 32 stores the basic data of the tools input from the input unit 31 for each tool no. Tools 5 of which basic data are stored in the storage unit 32 include not only tools to be used in a machining program which the operator intends to execute, but also tools remaining in the tool magazine for various reasons. One example of the case of calling up the basic data of the tools stored in the storage unit 32 at the display unit of the control panel is shown in FIG. 3.

In FIG. 3, the display unit displays a selected tool information screen 35. The tool information screen 35 is a screen for input, display, and editing of information relating to the tool 5. The tool information screen 35 shows a list of the tool nos., pot nos., tool types, and reference lengths and reference diameters and tolerances, and statuses of the tools 5 loaded in the tool magazine 41. The "tool nos." are numbers for identifying the respective tools. The "pot no." column shows the no. of the tool pocket of the tool magazine 41 in which a tool is loaded. The "spindle tool" shows a tool attached to the spindle. "Next tool" shows the tool arranged at the tool standby position and scheduled to be used next. The tool 5 being measured is a tool with check marks 35a or 35b in the check boxes of the "tool length" or "tool diameter" column of the "batch measurement" column. Note that, the display unit of the present embodiment can show not only the tool information screen 35, but also a program editing screen, coordinate information screen, program execution information screen, and machining result screen selected by buttons on the screen, but these screens are not directly related to the present invention, so explanations will be omitted.

The judging unit 33 compares the measured dimensions of a measured tool 5 received from the image processing part (not shown) of the tool measuring device 24 with the reference dimensions of the tool contained in the basic data of the tools stored in the storage unit 32 and judges if the difference of the dimensions between the two is within a predetermined allowable range. Further, the judging unit 33 sends a "normal" signal as the status to the storage unit 32 if the difference in dimensions is in the allowable range and deems that the measured tool 5 is different from the desired tool and sends an "improper" or "damaged" warning signal to the storage unit 32 if outside the allowable range.

In the present embodiment, not all of the tools 5 loaded in the tool magazine 41 are meant to be measured. The tools 5 used for machining are the tools to be measured. Whether a tool is a tool to be measured can be learned by a check mark 35a or 35b in the check boxes of the "tool length" and "tool diameter" columns of the "batch measurement" in the tool information screen 35. Whether the tool length is to be measured, the tool diameter is to be measured, or both are to be measured is judged according to the machining content. This judgment is usually performed by the operator of the machine tool 1 or the editor etc. of the machining program of the CAM system. In addition, an embodiment in which the nos. of the tools to be used for machining are automatically extracted from the machining program is also possible. Further, an embodiment in which whether a tool path is being corrected in the direction of the tool length in the machining program or is being corrected in the direction of the tool diameter is checked and which of the tool length and tool diameter is measured is automatically determined is also possible.

The command unit 34 controls the tool magazine 41 and tool shifter 44 so that the plurality of tools 5 to be measured loaded at the tool magazine 41 sequentially move to the tool standby position and return to their original locations in the tool magazine 41 after their images are captured. The command unit 34 can issue a command to the tool measuring device 24 so as to capture the image of a tool 5 being measured when arranged at the tool standby position and can issue a command to the tool measuring device 24 as to whether to output measurement results of just the tool length or both the tool length and tool diameter.

In the present embodiment, the plurality of tools 5 selected for measurement are measured immediately when these are loaded in the tool magazine 41 and the configuration of the tools in the tool magazine 41 is changed. The tools 5 specifically start to be measured by the operator pushing a batch measurement button 35c on the tool information screen 35 then pushing an execute button (not shown) of the control panel (not shown). This being so, receiving the command from the control device, the tool changer 40 and tool measuring device 24 sequentially measure the selected plurality of dimensions of the tool 5. The measurement results are displayed in the status column of the tool information screen 35 in a relatively short period of time. Therefore, the operator can confirm the measurement results before the start of machining and can devise some countermeasure if the status is "improper".

The tool information screen 35 of FIG. 3 displays "improper" in the status column of the flat end mill of the tool number 2, so it is learned that the difference in the actual measured dimension and reference dimension of the tool length or tool diameter exceeds the allowable range. The reason for this "improper" is that a tool 5 other than a tool prescribed by tool no. 2 is loaded in pot no. 2 of the tool magazine 41. In this case, a wrong tool may be loaded, the machining program may have an error, or the input basic data of the tools may include an error. For this reason, the operator actually checks the tool loaded at the pot no. 2 of the tool magazine 41 and if it is a mistakenly loaded tool, replaces it with the correct desired tool 5. Next, the operator checks the content of the machining program to be executed, checks if there is an error in the machining program, and corrects the machining program if there is an error in it. Furthermore, the operator checks if there is an error in the input basic data of the tools 5 and corrects any error. After checking the tool 5, machining program, and basic data of the tools 5, discovering there is an error in one, and correcting it, the tool measurement operation is performed another time and it is checked if the "normal" status is displayed for all of the tools 5.

If the operator executes the machining program while overlooking the display "improper" on the tool information screen 35, in the present embodiment, the control device 30 suspends the machining before the improper tool 5 loaded in pot no. 2 of the tool magazine 41 is conveyed by the tool shifter 44 to the standby position so that that tool 5 is not used for machining.

In the present embodiment, the tools 5 may be measured not just right after the tools 5 are loaded in the tool magazine 41, but also each time one tool 5 used for machining is returned to the tool standby position after machining. If the difference between the actual measured dimensions and reference dimensions of the tool 5 obtained by this measurement after machining exceeds a predetermined allowable range, the judging unit 33 deems the measured tool 5 to be a damaged tool and sends a warning signal of a damaged tool to the storage unit 32. As a result, "damaged" is displayed on the tool information screen 35. The reason why the tool is deemed damaged is that the measured tool 5 was normal at the previous measurement. That is, it is known that there is no error in the machining program and the basic data of the tool 5, so if possible to obtain a tool 5 of the same shape as the damaged tool 5 before use, continued machining is possible without concern over poor machining of the workpiece or concern over the machine tool body 10 being damaged. Accordingly, even if a warning signal of damage is issued, if a spare tool 5 of the same shape is prepared in another pot no. of the tool magazine 41, a command from the control device 30 can be used to replace the damaged tool 5 with a spare tool 5 and the operation can be continued. If there is no spare tool 5, the machining is suspended.

According to the machine tool 1 of the present embodiment, the dimensions of the tools 5 loaded in the tool magazine 41 of the tool changer 40 and used for actual machining are measured by the tool measuring device 24 and judged for suitability by the control device 30, so it becomes possible to easily detect a mistakenly loaded tool in the tool magazine 41 or a damaged tool. As a result, it becomes possible to prevent the occurrence of defects and prevent damage to the machine tool body 10.

Instead of measuring the tool when the tool 5 is returned to the standby position after machining, it is also possible to measure it each time the tool is placed in the standby position before machining. In this measurement before machining as well, the operator judges that the tool is improper if the allowable range is exceeded when first measuring the tool 5 being measured after being loaded in the tool magazine. Further, the operator judges that the tool is damaged if the allowable range is exceeded in measurement before machining when the tool 5 being measured has been used even one time after being loaded in the tool magazine.

The control device 30 in the present embodiment has, as statuses displayed on the tool information screen 35, "normal", "improper", and "damaged" and also "worn". The control device 30 can cumulatively add the usage time of each tool 5 used for machining and store it in the storage unit 32 and issue a warning of "worn" when the usage time of a tool 5 reaches the end of a predetermined service life. An embodiment in which the control device 30 issues a warning of "worn" based on not the usage time, but the distance of movement of a tool 5 during machining is also possible. At the time when a "worn" warning is issued, the tool measuring device 24 has not detected an abnormality of the tool 5. Unlike when the tool is improper or damaged, this is a state where there is no concern of the workpiece being poorly machined or concern of the machine tool body 10 being damaged. Accordingly, the display unit may just display "worn" to convey to the operator that it is the time to replace the tool 5 with a new one and not suspend the machining.

The tool measuring device 24 of the machine tool 1 of the present embodiment is an image-capturing type using a camera 25, but the tool measuring device 24 is not limited to this type. Any device able to measure the dimensions of the tools 5 can be employed. For example, an embodiment provided with a device of a type using a laser beam or a type using a probe made to contact tools 5 as a tool measuring device 24 is also possible.

REFERENCE SIGNS LIST 1. machine tool
5. tool
10. machine tool body
24. tool measuring device
25. camera
26. lighting device
30. control device
31. input unit
32. storage unit
33. judging unit
34. command unit
40. tool changer
41. tool magazine
44. tool shifter

The invention claimed is:
1. A machine tool having a tool changer and sequentially changing tools to machine a workpiece, the machine tool comprising:
   a computing device comprising a CPU and receiving a machining program output from a CAM system and basic data of the tools;
   memory storing the basic data of the tools input for each tool no;
   a tool measuring device comprising an image-capturing device and measuring dimensions of the tools loaded in a tool magazine of the tool changer, and
   a display displaying information on the tools, the computing device comparing the basic data of the tools stored in the memory with actual measurement data measured by the tool measuring device and judging that a measured tool differs from a desired tool if a difference in dimensions between the measured and desired tools exceeds a predetermined allowable range, wherein the tool measuring device measures the tools in a first time period after they are loaded in the tool magazine and before they are used for machining, the computing device determines that a measured tool measured in the first time period is a mistakenly loaded improper tool and sends a first warning signal to the display if the difference in dimensions between the measured tool measured in the first time period and the desired tool exceeds the allowable range, the tool measuring device measures the tools in a second time period after they are used for machining and before they are returned to the tool magazine, the computing device determines that a measured tool measured in the second time period is a damaged tool and sends a second warning signal to the display if the difference in dimensions between the measured tool measured in the second time period and the desired tool exceeds the allowable range, the display displays a first status of the measured tool, presenting that the measured tool is an improper tool, based on the first warning signal and displays a second status of the measured tool, presenting that the measured tool is a damaged tool, based on the second warning signal, and the display displays the first status and the second status of the measured tool together with reference dimensions of the desired tool.

2. The machine tool of claim 1, wherein the machine tool suspends machining before the machining is performed by the improper tool when the machining program is executed regardless of the first warning signal being issued.

3. The machine tool of claim 1, wherein the machine tool automatically changes the tool judged to be a damaged tool to a spare tool loaded in the tool magazine in advance and executes the machining program when the second warning signal is issued.

4. The machine tool of claim 1, wherein the machine tool cumulatively adds and stores a machining time or distance of movement for each of the tools when the tool is used for machining and issues a third warning signal indicating the tool has reached the end of its service life when the machining time or the distance of movement exceeds a predetermined value.

5. The machine tool of claim 4, wherein the image-capturing device is arranged inside a tool storage chamber of the machine tool and together with the tool changer and captures an image of the workpiece.

* * * * *